United States Patent
Chereshnev et al.

(10) Patent No.: US 9,325,715 B1
(45) Date of Patent: Apr. 26, 2016

(54) SYSTEM AND METHOD FOR CONTROLLING ACCESS TO PERSONAL USER DATA

(71) Applicant: Kaspersky Lab ZAO, Moscow (RU)

(72) Inventors: Evgeny M. Chereshnev, Moscow (RU); Vartan M. Minasyan, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/723,966

(22) Filed: May 28, 2015

(30) Foreign Application Priority Data

Mar. 31, 2015 (RU) .................................. 2015111426

(51) Int. Cl.
*G06F 21/10* (2013.01)
*H04L 29/06* (2006.01)

(52) U.S. Cl.
CPC ............ *H04L 63/10* (2013.01); *H04L 63/1433* (2013.01)

(58) Field of Classification Search
CPC .. G06F 21/10; G06F 21/316; G06F 17/30828
See application file for complete search history.

(56) References Cited

U.S. PATENT DOCUMENTS

| | | | | |
|---|---|---|---|---|
| 7,302,429 B1 * | 11/2007 | Wanker | ................... | G06Q 30/02 |
| 7,685,431 B1 * | 3/2010 | Mullany | ................... | G06F 21/46 |
| | | | | 713/182 |
| 8,285,841 B2 * | 10/2012 | Oostlander | ........... | G06F 11/302 |
| | | | | 709/223 |
| 8,756,650 B2 | 6/2014 | Wolfson et al. | | |
| 8,918,904 B2 | 12/2014 | Sanin et al. | | |
| 2004/0054563 A1 * | 3/2004 | Douglas | ........................... | 705/7 |
| 2006/0116898 A1 * | 6/2006 | Peterson | .............. | G06Q 40/025 |
| | | | | 705/38 |
| 2006/0229896 A1 * | 10/2006 | Rosen | ................ | G06Q 10/1053 |
| | | | | 705/321 |
| 2008/0195424 A1 * | 8/2008 | Pierce | .................... | G06Q 40/08 |
| | | | | 705/4 |
| 2012/0159647 A1 * | 6/2012 | Sanin et al. | ..................... | 726/28 |
| 2012/0233013 A1 * | 9/2012 | Smith | .................... | G06Q 40/00 |
| | | | | 705/26.5 |
| 2013/0139238 A1 | 5/2013 | Ryan | | |
| 2013/0166358 A1 * | 6/2013 | Parmar | ............. | G06Q 10/06393 |
| | | | | 705/7.39 |
| 2013/0179215 A1 * | 7/2013 | Foster | .................... | G06Q 10/10 |
| | | | | 705/7.28 |
| 2014/0143886 A1 | 5/2014 | Eversoll et al. | | |
| 2014/0188838 A1 * | 7/2014 | Strugov | ................. | G06Q 50/01 |
| | | | | 707/710 |
| 2014/0337086 A1 * | 11/2014 | Asenjo | ............... | G06Q 10/0635 |
| | | | | 705/7.28 |
| 2015/0025917 A1 * | 1/2015 | Stempora | ............... | G06Q 40/08 |
| | | | | 705/4 |
| 2015/0161738 A1 * | 6/2015 | Stempora | ............... | G06Q 40/08 |
| | | | | 705/4 |

* cited by examiner

*Primary Examiner* — Hadi Armouche
*Assistant Examiner* — Ali Shayanfar
(74) *Attorney, Agent, or Firm* — Arent Fox LLP; Michael Fainberg (57) ABSTRACT

Disclosed are system and methods for controlling access of a consumer to personal data of a user. An example method includes: collecting information about the consumer of personal data; comparing the collected information with one or more templates containing risk criteria to determine whether a risk is associated with the consumer; setting, based on the determined risk, consumer access parameters for access of the consumer to the personal information of the user; and controlling access of the consumer to the personal data of the user based on the set consumer access parameters.

20 Claims, 4 Drawing Sheets

SYSTEM AND METHOD FOR CONTROLLING ACCESS TO PERSONAL USER DATA

CROSS-REFERENCE TO RELATED APPLICATIONS

This application claims benefit of priority under 35 U.S.C. 119(a)-(d) to a Russian Application No. 2015111426 filed on Mar. 31, 2015, which is incorporated by reference herein.

FIELD OF TECHNOLOGY

The present disclosure relates generally the field of computer security, and more specifically, to systems and methods for controlling access of a consumer to personal data of a user.

BACKGROUND

At present, services and applications are collecting a mass of personal information about the user (behavior on the net and on the device, data sets, actions on the Internet, location, contacts with other users, etc.). This is occurring in both a clear and clandestine manner, and very often without awareness by the user of the data collection. Neither is the user aware of how the data collected is used afterwards, or whether he can control this process.

Systems of centralized control of personal user information are being created to help the user exercise control over the use of his own personal data. These systems allow one to control the personal user data, to determine and monitor the volume of personal information collected and saved (such as a set of personal documents, date of birth, location, passwords for authorization on other services, history of actions on the Internet, characteristic behavior patterns, gender, family status), to determine the level of access by services to this information (from total anonymity to a fully open profile), and to carry out an authorization of services when accessing the personal user data. As an example of the functioning of such systems, one can mention technologies such as MS Account, Apple ID, Google Account, Mozilla Persona.

However, the process of granting and revoking access rights to personal data is in no way automated, and the user is forced to control this process by hand. For example, patent application US20140143886A1 describes a system for control of personal data which lets the user from any given device manually revoke access rights to his personal data.

Thus, there is a need to automate the process of control of personal user data.

SUMMARY

Disclosed are system and methods for controlling access of a consumer to personal data of a user. One technical result of the disclosed system and methods consists in an automated control of access to personal data of the user by changing the parameters of access to personal data as a function of risks associated with the consumer of personal data.

An example method for controlling access of a consumer to personal data of a user includes: collecting information about the consumer of personal data; comparing, by a hardware processor, the collected information with one or more templates containing risk criteria to determine whether a risk is associated with the consumer; setting, based on the determined risk, by the hardware processor, consumer access parameters for access of the consumer to the personal information of the user; and controlling, by the hardware processor, access of the consumer to the personal data of the user based on the set consumer access parameters.

In one example aspect, the received consumer data include at least one of: parameters of the personal information consumer, wherein the parameters comprise at least one of: a consumer service price for the user, a total price of consumer services provided to the user, and a location of the server storing the personal information of the user; statistics about the personal information consumer, wherein the statistics comprise at least one of: a number of user complaints over a time interval, a number of a specific type of incidents per over a time interval, a rating of the personal information consumer, and a number of users using a service provided by the consumer; notifications about the personal information consumer, wherein the notifications comprise at least one of: a notification from the consumer about server maintenance, and a notification of broken connection to a customer server; and security incident reports about the personal information consumer, wherein the reports comprise at least one of: a report of potential unauthorized access to a consumer server, and a report of a personal data theft from the consumer.

In one example aspect, the consumer data is received from at least one of: an external or internal monitoring system; a notification system; a user security application; and the consumer.

In one example aspect, the set of templates includes at least one of: a global set of templates; and a local set of templates specific to the user.

In one example aspect, the risk event is: a political risk event; a reputational risk event; a financial risk event; a security risk event; or a legal risk event.

In one example aspect, the setting of consumer access parameters includes at least one of: changing consumer's time limits of access to the personal information of the user; revoking consumer's access privileges to the personal information of the user; granting consumer access privileges to the personal information of the user; blocking consumer's access to the personal information of the user; granting consumer access to the personal information of the user; and rejecting services provided by the consumer.

In one example aspect, each template includes a set of criteria; wherein each criterion is assigned a numeric value based on the received consumer data; and wherein the detecting whether a risk event exists includes at least one of: comparing a linear function of criteria with a numeric threshold; comparing a numeric function of criteria with a numeric threshold; applying a neural network algorithm to the set of criteria; and applying a fuzzy logic algorithm to the set of criteria.

In another aspect, a example system for controlling access of a consumer to personal data of a user, comprising: an collection module executable on a hardware processor and configured to: collect information about the consumer of personal data; an template storage module configured to: store a plurality of templates containing risk criteria; an analysis module executable on the hardware processor and configured to: compare the collected information with the one or more templates to determine whether a risk is associated with the consumer; and an access control module executable on a hardware processor and configured to: set, based on the determined risk, consumer access parameters for access of the consumer to the personal information of the user; and control access of the consumer to the personal data of the user based on the set consumer access parameters.

In another aspect, an example computer program product stored on a non-transitory computer-readable medium for controlling access of a consumer to personal data of a user, the computer product including computer-executable instructions for: collecting information about the consumer of personal data; comparing the collected information with one or more templates containing risk criteria to determine whether a risk is associated with the consumer; setting, based on the determined risk, consumer access parameters for access of the consumer to the personal information of the user; and controlling access of the consumer to the personal data of the user based on the set consumer access parameters.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

DETAILED DESCRIPTION

Example aspects are described herein in the context of a system, method and computer program product for controlling access of a consumer of personal information to personal information of a user. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As used herein, the term "consumer of personal data" (the terms "data" and "information" will be used interchangeably herein), may include a service, an application, or a device working with personal user data. A consumer of personal data may be connected to a system of centralized control of personal user data, a description of which is provided below. An example of a consumer of personal data is Facebook or any other social network in which personal user data is processed. Control of the account of the user of any given social network can be done through a system of centralized control of personal user data. A consumer of personal data may be not only a social network or a cloud service, in the near future, as the Internet of Things is developed (a concept of a computing network of physical objects including embedded technologies for interacting with each other or with the environment), the consumers of personal data may be the physical objects in our environment, including TV sets (this has happed already), consumer appliances, cars, furniture, and clothing. The present disclosure allows controlling the usage of the personal user data by the consumers of personal data and to react promptly in response to various changes in the process.

Figure 1:
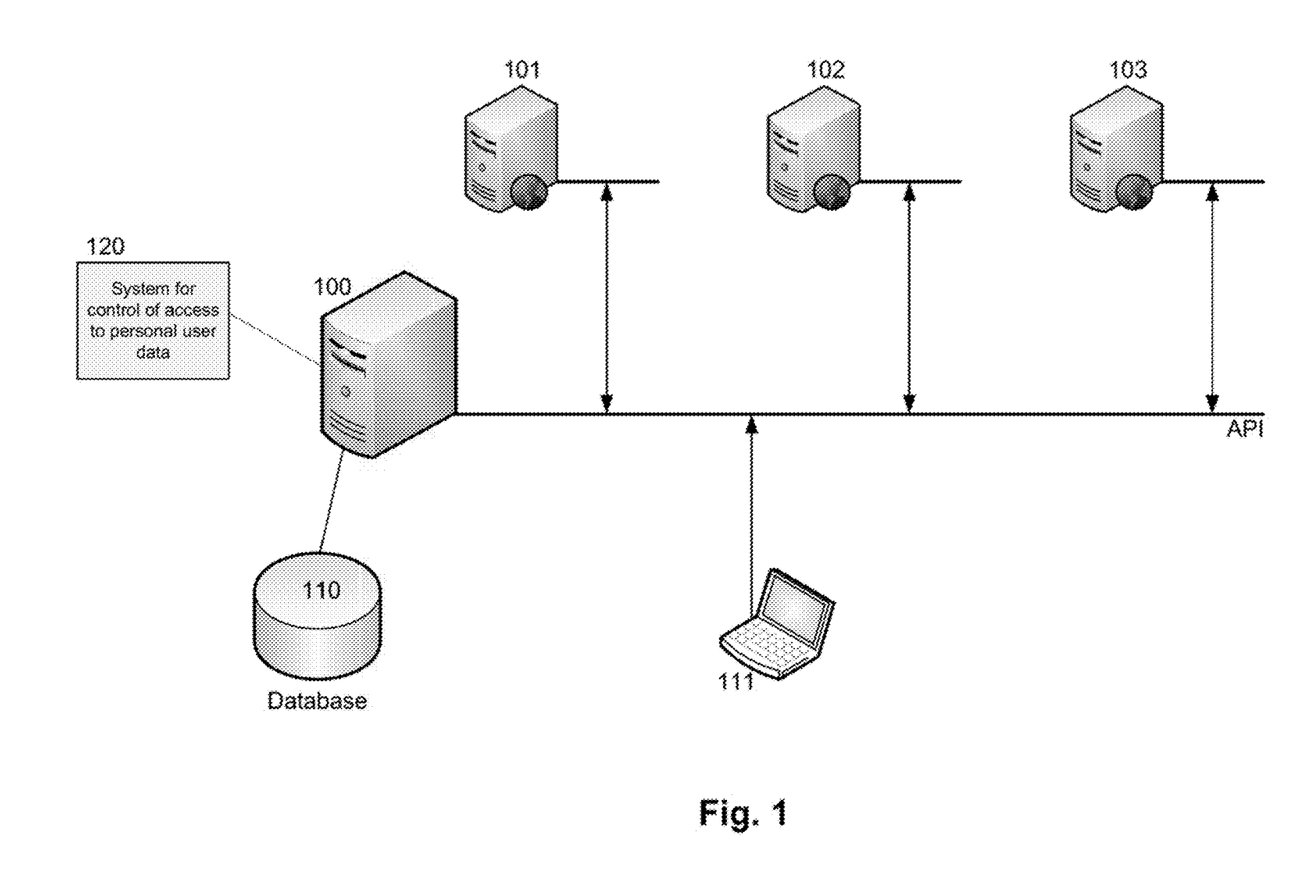
FIG. 1 shows a block diagram of an example user's interaction with consumers of personal data via a system of centralized control of personal data.

FIG. 1 shows a diagram of an example user's interaction with consumers of personal data via a system of centralized control of personal data. The actual system of centralized control of personal data 100 may constitute a server or group of servers connected to a database 110 in which the personal user data is contained—the user profiles which they would like to control, with all the personal information needed for a reliable authentication of the user or for the working of consumers of personal data. In one aspect, the database 110 can be defined by the location where the data is stored, the number of servers, and their physical locations; for example, the data stored in it may belong to some particular company or government. In another example aspect, the data may be decentralized and distributed among database nodes such that the full information set is not concentrated at any one node. The user 111 may store his personal information either in a public decentralized repository or in a personal repository (e.g., on his own portable data storage medium), being able to select the information storage country or the company where the information is stored. Access to this data may be performed via the system of centralized control of personal data 100 directly, for example, through a web interface of the system, or via a device of the user 111. The system 100 may have application programming interfaces (API) for control of the personal user data and interaction with consumers of personal data 101, 102, 103. A system for control of access to personal user data 120 may be part of the system 100.

Figure 2:
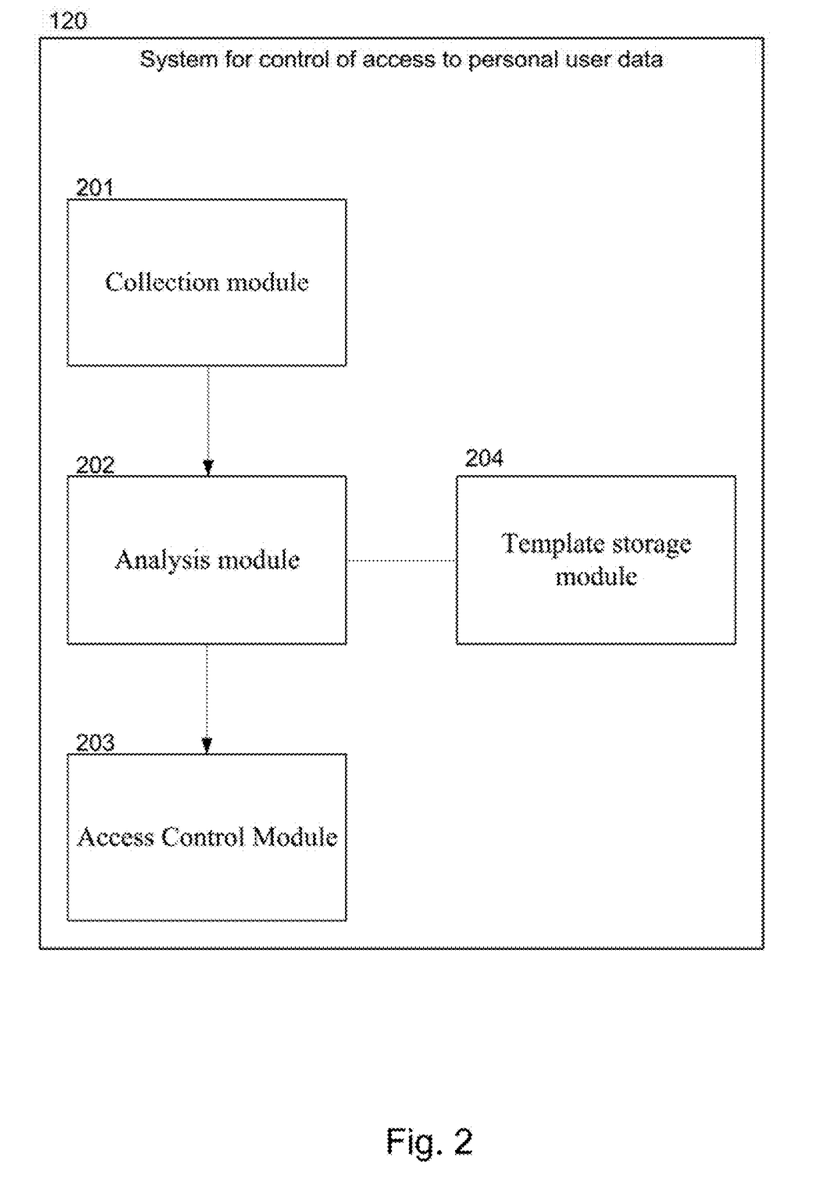
FIG. 2 shows a block diagram of an example system for control of access to personal user data.

FIG. 2 shows a diagram of an example system for control of access to personal data 120, which includes: a collection module 201, an analysis module 202, an access control module 203 and a template storage module 204. The collection module 201 is configured to collect information on the consumers of personal data. The information may include, but not limited to:

parameters of the consumers of personal data (such as the cost of the particular service provided to the user, or the total cost of all services provided to the user or the geographical location of the server on which the personal user data is being stored, provisions of the licensing agreement with the user, and so on);

statistical data on the consumers of personal data (for example, the number of complaints from users or incidents of a particular type in a selected interval of time or the rating of the consumer of personal data or the number of users making use of a particular service, and so on);

notifications (e.g., messages) pertaining to the consumers of personal data, including notifications sent by the consumer of personal data itself in the context of the system of centralized control of personal data 100 shown in FIG. 1 (for example, a notification from the consumer of personal data as to scheduled repair work on the server or a notification as to no connection between the server and the consumer of personal data);

security incidents and events involving the consumers of personal data (for example, information as to a potential hacking of the servers of the consumer of personal data or an actual theft of personal user data, and so on); and any other data sets having a connection to the consumers of personal data.

Information may be collected from various sources, such as:

monitoring systems (external or internal with respect the system of centralized control of personal data 100);

notification systems within the system of centralized control of personal data 100;

security applications installed on the computers of the users interacting with the consumers of personal data;

the actual consumers of personal data.

The collection module 201 transmits the information collected in regard to the consumers of personal data to the analysis module 202.

In one example aspect, the analysis module 202 performs an analysis of the information collected to identify risks associated with the consumers of personal data. Risks may be of different types: political, reputational, financial, security risks, legal risks, and so on. For example, a user pays for a cloud (or remote) file repository service at one of the consumers of personal data. If the cost of the service increases, and the user overlooks the notification from the consumer of personal data stating that the user should give up the service by a given date if he does not agree with the new cost, then if the user does not give up the service he will be forced to pay the increased cost, and thus incur a loss. In this regard, the user incurs financial risks. Another example, is the situation when the usage rules within an end user license agreement (EULA) with respect to one of the services provided to the user by the consumer of personal data change to the user's detriment, for example, to allow transmission of personal data to a third party, which may contradict user's confidentiality requirements. The analysis module 202 monitors information arriving from various sources and automatically make a decision (for example, to automatically give up the service being provided by the consumer of personal data) when the corresponding risks are identified (e.g., week data privacy). In one aspect, the analysis module 202 uses templates from the template storage module 204 to identify risks. Each template from the template storage module 204 consists of at least one risk criterion. In a particular instance, the risk criterion is a feature, a condition or a decision-making rule for identifying the correspondence of something to given risk requirements. If the information collected with respect to a specific consumer of personal data corresponds to the requirements of the template, then a risk is identified for this consumer of personal data.

In one example aspect, the template storage module 204 can include a global list of templates and a local list of templates. The templates from the global list of templates are configured to identify risks associated with groups of users, for example, a template identifying a risk of theft of payment information from personal data. The templates from the local list of templates are intended to identify risks in regard to a particular user. The templates from the local list of templates can be formed automatically from the user's requirements on the consumers of personal data or be specified by hand by the users. Such templates will apply only to a particular user. The templates may be grouped with respect to other properties, for example, in accordance with the type of risks identified by these templates.

In one example aspect, the analysis module 202 may sue templates with one or more criteria to identify risk by comparing the templates from the template storage module 204 with the information obtained from the collection module 201. Thus, a search is made for exact matches, for example, when processing the parameters of the consumers of personal data, notifications in the context of the system of centralized control of personal data 100 or messages from the monitoring system, as well as any other data having a predetermined format and message structure. For example, the country where the user resides introduces changes to the laws requiring all consumers of personal data to store the personal data of its citizens within the country. For this situation, a template is generated from the global list of templates with a single criterion, performing check of the parameters of the consumers of personal data pertaining to the country of storage of the personal data of users who are citizens of the country having introduced the changes in its laws. Based on the results of the check, the corresponding users can be notified as to the presence of legal risks in regard to at least one consumer of personal data, or instead the system for control of access to personal user data 120 may automatically block access or revoke the access rights to personal data of the corresponding users until such time as the identified risk has been removed.

In another example aspect, the analysis module 202 may use heuristic analyzers to identify risks associated with the consumers of personal data by using templates consisting of sets of criteria linked by logical operators (such as AND/OR operators). Each criterion can be assigned either a Boolean value or a certain discrete value. For example, a criterion identifying a certain message received from the monitoring systems will take on a value of 1—message identified, or 0—no message. In another example aspect, the criterion takes on a value from 0 to 10, where 0 means no incidents related to loss of personal user data by the consumer of personal data and 10 means frequent incidents. The criteria may include actions of users similar to the current user. For example, if among the users with the same country of residence as the current user the number of rejections of PayPal electronic wallet services increases abruptly, the current user can be at least informed of this fact. Each of the criteria may have a significance factor, reflecting the importance of the criterion used. This factor is designated, or hard-coded. The use of this factor makes it possible to allow for differences in the significance of the criteria when identifying a risk. For templates consisting of more than one criterion, one can use different methods of risk identification, such as: a neural net, fuzzy logic, summation with weighting of criteria. For example, when using the method of summation with weighting of criteria for a template consisting of n criteria, it is necessary to compute the total factor for fulfillment of the template by the following formula:

$$Kf = X1*Kr1 + X2*Kr2 + X3*Kr3 + \ldots + Xn*Krn, \text{where:}$$

Kf—is the factor for fulfillment of the template;

Xn—is the significance factor of the n-th criterion;

Krn—is the criterion value of the n-th criterion.

Then, to identify the risk corresponding to the particular template, one can use a predetermined numeric threshold value (chosen empirically, for example), which is compared to the calculated factor for fulfillment of the template. For example, if the factor for fulfillment of the template exceeds a numeric threshold value, then a risk corresponding to the template is deemed to have been identified, and the analysis module 202 will send appropriate instructions to the access control module 203.

In one example aspect, the access control module 203 is configured to change the consumer access parameters to personal data on the basis of the identified risks with respect to the consumer of personal data. The changing of the consumer access parameters to personal data includes, but not limited to:

changing the period of validity for access rights to personal user data;

revoking of access rights to personal user data;

granting access rights to personal user data;

blocking access to personal user data;

allowing access to personal user data; and giving up a service being provided by a consumer of personal data.

In one example aspect, specific corresponding changes of access parameters may be assigned to specific templates. For example, upon detecting a risk with a template A, the access control module 203 may block access to the personal user data for the consumer of personal data. The specific changes of access parameters may be assigned to a type of risk common to several templates. For example, upon detecting a financial risk, the access control module 203 may automatically cancel the service provided by the consumer of personal data.

In another example aspect, the changes of access parameters may depend on how much the factor for fulfillment of the template exceeds a numeric threshold value. For example, if factor for fulfillment of the template exceeds a numeric threshold value by not more than 0.05, the access control module 203 may notify the user about the identified risk without changing the access parameters automatically and, in cases of greater excess, revoke access rights to the personal user data.

Figure 3:
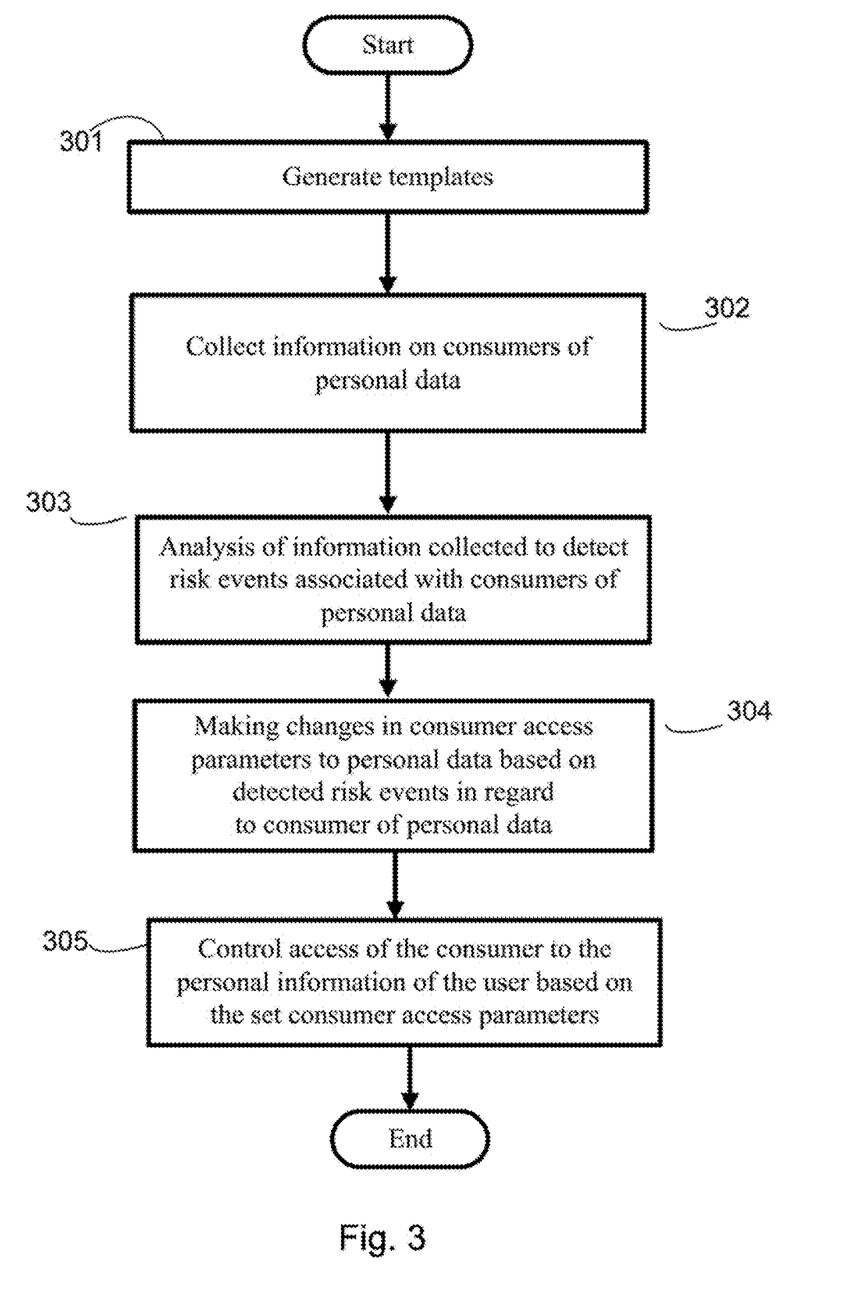
FIG. 3 shows a flow diagram of an example method of control of access to personal user data.

FIG. 3 shows a block diagram of an example method of control of access to personal user data. In step 301, the method collects information about the consumers of personal user data. The information collected can be standardized or converted into a format convenient for making a comparison with the templates. In step 302, the method analyzes information collected in order to determine risks relating to the consumers of personal data. In the course of the analysis, the information collected in step 302 is compared to the templates. If the template contains more than one criterion, significance factors of the criteria and a numeric threshold value may be used to identify the risk corresponding to the given template. At step 303, the method identifies the risks related to the consumers of personal data. A risk is identified if the information collected in step 301 matches or corresponds to a criteria in the template. After this, in step 304, the method changes the consumer access parameters to the personal data based on the identified risks with respect to the consumer of personal data.

Figure 4:
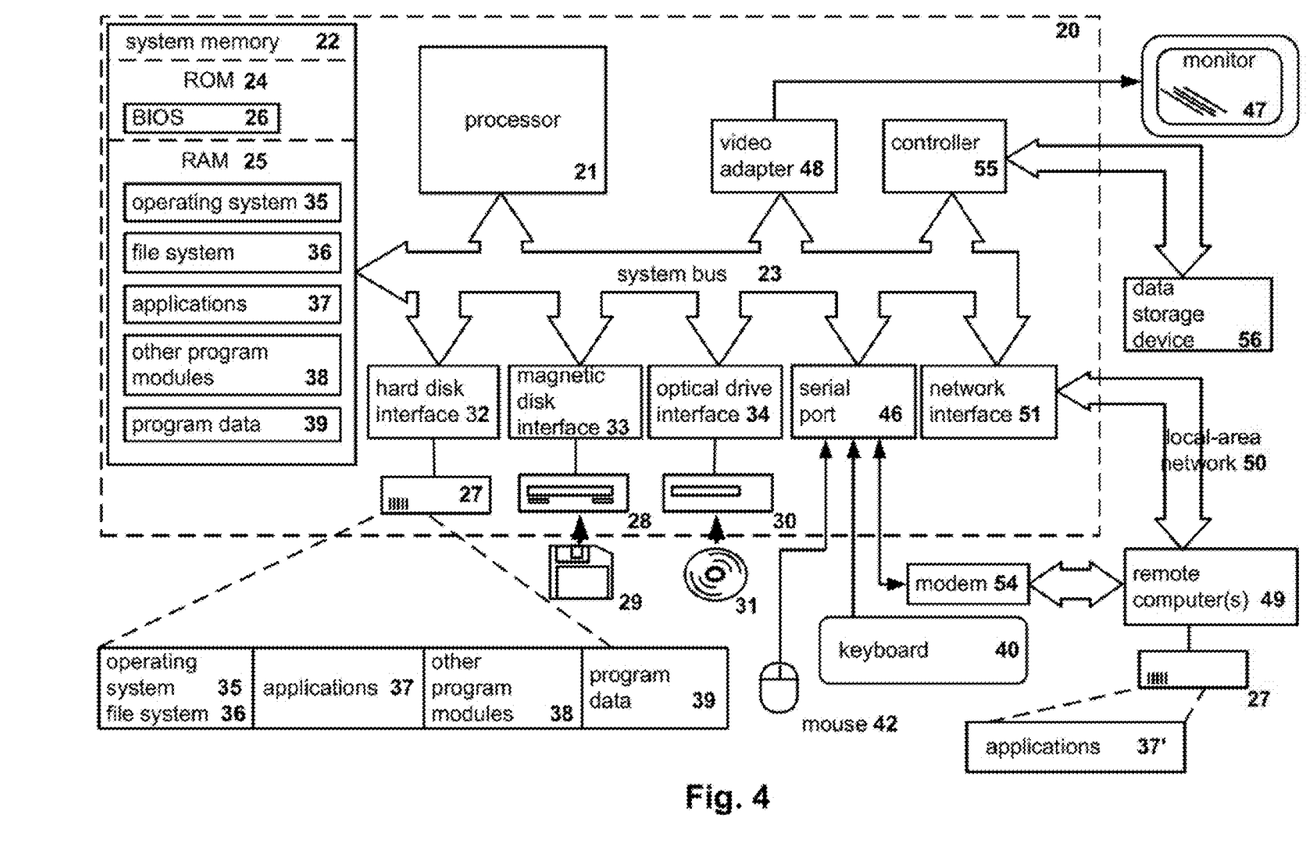
FIG. 4 shows an example of a general-purpose computer system that may be used to implement systems and methods for control of access to personal user data.

FIG. 4 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access of a consumer to personal data of a user, comprising:
    collecting information about the consumer of personal data, wherein the collected information comprises at least one of a plurality of elements including service usage parameters associated with the consumer, statistical data associated with the consumer, and security incidents involving the consumer;
    comparing, by a hardware processor, the collected information with one or more templates to determine a risk that is associated with the consumer, wherein each template includes a set of criteria corresponding to at least two of the plurality of elements, each criterion is assigned a numeric value and a weighting factor based on the collected information, and the risk corresponds to a summation of the numeric value and weighting factor of each criterion;
    setting, based on the determined risk, by the hardware processor, consumer access parameters for the consumer to access the personal data of the user;
    controlling, by the hardware processor, access of the consumer to the personal data of the user based on the consumer access parameters;
    automatically modifying the consumer access parameters upon detecting that the summation exceeds a selected range of a defined threshold value; and
    notifying the user, without modifying the consumer access parameters, of the risk upon detecting that the summation does not exceed the selected range of the defined threshold value.

2. The method of claim 1,
    wherein the service usage parameters comprise at least one of:
        a consumer service price for the user,
        a total price of consumer services provided to the user,
        a location of the server storing the personal information of the user, and
    wherein the statistical data comprises at least one of:
        a number of user complaints over a time interval,
        a number of a specific type of incidents per over a time interval,
        a rating of the personal information consumer, and
        a number of users using a service provided by the consumer; and
    wherein the security incidents comprise at least one of:
        a report of potential unauthorized access to a consumer server, and
        a report of a personal data theft from the consumer,
    wherein the collected information further comprising notifications about the personal information consumer,
        wherein the notifications comprise at least one of:
            a notification from the consumer about server maintenance, and
            a notification of broken connection to a customer server.

3. The method of claim 1, wherein the information about the consumer is received from at least one of:
    an external or internal monitoring system;
    a notification system;
    a user security application; and
    the consumer.

4. The method of claim 1, wherein the set of templates includes:
    a global set of templates configured to identify risks associated with groups of users; and
    a local set of templates indicating risks specific to the user.

5. The method of claim 1, wherein the risk includes at least on of:
    a political risk;
    a reputational risk;
    a financial risk;
    a security risk; and
    a legal risk.

6. The method of claim 1, wherein the setting of consumer access parameters includes at least one of:
    changing consumer's time limits of access to the personal data of the user;
    revoking consumer's access privileges to the personal data of the user;
    granting consumer access privileges to the personal data of the user;
    blocking consumer's access to the personal data of the user;
    granting consumer access to the personal data of the user; and
    rejecting services provided by the consumer.

7. The method of claim 1,
    wherein the detecting whether a risk exists includes at least one of:
        comparing a linear function of criteria with a numeric threshold;

comparing a numeric function of criteria with a numeric threshold;
applying a neural network algorithm to the set of criteria; and
applying a fuzzy logic algorithm to the set of criteria.

8. A system for controlling access of a consumer to personal data of a user, comprising:
a collection module executable on a hardware processor and configured to:
collect information about the consumer of personal data, wherein the collected information comprises at least one of a plurality of elements including service usage parameters associated with the consumer, statistical data associated with the consumer, and security incidents involving the consumer;
a template storage module configured to:
store a plurality of templates containing risk criteria;
an analysis module executable on the hardware processor and configured to:
compare the collected information with the one or more templates to determine a risk that is associated with the consumer, wherein each template includes a set of criteria corresponding to at least two of the plurality of elements, each criterion is assigned a numeric value and a weighting factor based on the collected information, and the risk corresponds to a summation of the numeric value and weighting factor of each criterion; and
an access control module executable on the hardware processor and configured to:
set, based on the determined risk, consumer access parameters for the consumer to access the personal data of the user;
control access of the consumer to the personal data of the user based on the consumer access parameters; and
automatically modify the consumer access parameters upon detecting that the summation exceeds a selected range of a defined threshold value; and
notify the user, without modifying the consumer access parameters, of the risk upon detecting that the summation does not exceed the selected range of the defined threshold value.

9. The system of claim 8,
wherein the service usage parameters comprise at least one of:
a consumer service price for the user,
a total price of consumer services provided to the user,
a location of the server storing the personal information of the user, and
wherein the statistical data comprises at least one of:
a number of user complaints over a time interval,
a number of a specific type of incidents per over a time interval,
a rating of the personal information consumer, and
a number of users using a service provided by the consumer; and
wherein the security incidents comprise at least one of:
a report of potential unauthorized access to a consumer server, and
a report of a personal data theft from the consumer,
wherein the collected information further comprising notifications about the personal information consumer, wherein the notifications comprise at least one of:
a notification from the consumer about server maintenance, and
a notification of broken connection to a customer server.

10. The system of claim 8, wherein the information about the consumers received from at least one of:
an external or internal monitoring system;
a notification system;
a user security application; and
the consumer.

11. The system of claim 8, wherein the set of templates includes:
a global set of templates configured to identify risks associated with groups of users; and
a local set of templates indicating risks specific to the user.

12. The system of claim 8, wherein the risk includes at least on of:
a political risk;
a reputational risk;
a financial risk;
a security risk; and
a legal risk.

13. The system of claim 8, wherein the setting of consumer access parameters includes at least one of:
changing consumer's time limits of access to the personal data of the user;
revoking consumer's access privileges to the personal data of the user;
granting consumer access privileges to the personal data of the user;
blocking consumer's access to the personal data of the user;
granting consumer access to the personal data of the user; and
rejecting services provided by the consumer.

14. The system of claim 8,
wherein the detecting whether a risk exists includes at least one of:
comparing a linear function of criteria with a numeric threshold;
comparing a numeric function of criteria with a numeric threshold;
applying a neural network algorithm to the set of criteria; and
applying a fuzzy logic algorithm to the set of criteria.

15. A non-transitory computer-readable medium storing computer executable instructions for controlling access of a consumer to personal data of a user, including instructions for:
collecting information about the consumer of personal data, wherein the collected information comprises at least one of a plurality of elements including service usage parameters associated with the consumer, statistical data associated with the consumer, and security incidents involving the consumer;
comparing, by a hardware processor, the collected information with one or more templates to determine a risk that is associated with the consumer, wherein each template includes a set of criteria corresponding to at least two of the plurality of elements, each criterion is assigned a numeric value and a weighting factor based on the collected information, and the risk corresponds to a summation of the numeric value and weighting factor of each criterion;
setting, based on the determined risk, by the hardware processor, consumer access parameters for the consumer to access the personal data of the user;
controlling, by the hardware processor, access of the consumer to the personal data of the user based on the consumer access parameters;
automatically modifying the consumer access parameters upon detecting that the summation exceeds a selected range of a defined threshold value; and notifying the user, without modifying the consumer access parameters, of the risk upon detecting that the summation does not exceed the selected range of the defined threshold value.

16. The non-transitory computer-readable medium of claim 15,
wherein the service usage parameters comprise at least one of:
a consumer service price for the user,
a total price of consumer services provided to the user,
a location of the server storing the personal information of the user, and
wherein the statistical data comprises at least one of:
a number of user complaints over a time interval,
a number of a specific type of incidents per over a time interval,
a rating of the personal information consumer, and
a number of users using a service provided by the consumer; and
wherein the security incidents comprise at least one of:
a report of potential unauthorized access to a consumer server, and
a report of a personal data theft from the consumer,
wherein the collected information further comprising notifications about the personal information consumer, wherein the notifications comprise at least one of:
a notification from the consumer about server maintenance, and
a notification of broken connection to a customer server.

17. The computer program product of claim 15, wherein the set of templates includes at least one of:
a global set of templates; and
a local set of templates specific to the user.

18. The non-transitory computer-readable medium of claim 15, wherein the risk includes at least on of:
a political risk;
a reputational risk;
a financial risk;
a security risk; and
a legal risk.

19. The computer program product of claim 15, wherein the setting of consumer access parameters includes at least one of:
changing consumer's time limits of access to the personal information of the user;
revoking consumer's access privileges to the personal information of the user;
granting consumer access privileges to the personal information of the user;
blocking consumer's access to the personal information of the user;
granting consumer access to the personal information of the user; and
rejecting services provided by the consumer.

20. The computer program product of claim 15,
wherein the detecting whether a risk event exists includes at least one of:
comparing a linear function of criteria with a numeric threshold;
comparing a numeric function of criteria with a numeric threshold;
applying a neural network algorithm to the set of criteria; and
applying a fuzzy logic algorithm to the set of criteria.

* * * * *